（12） United States Patent
Okamoto et al.

(10) Patent No.: US 10,618,068 B2
(45) Date of Patent: Apr. 14, 2020

(54) METHOD FOR APPLYING INSULATIVE COATING TO CARBON-FIBER EXPOSED END OF COMPOSITE MATERIAL PART USING DISPENSER DEVICE

(71) Applicant: JAMCO CORPORATION, Mitaka-shi, Tokyo (JP)

(72) Inventors: Makoto Okamoto, Tokyo (JP); Masaya Watanabe, Tokyo (JP)

(73) Assignee: JAMCO CORPORATION, Mitaka-shi (JP)

( * ) Notice: Subject to any disclaimer, the term of this patent is extended or adjusted under 35 U.S.C. 154(b) by 0 days.

(21) Appl. No.: 16/475,500

(22) PCT Filed: Jan. 6, 2017

(86) PCT No.: PCT/JP2017/000308
§ 371 (c)(1),
(2) Date: Jul. 2, 2019

(87) PCT Pub. No.: WO2018/127976
PCT Pub. Date: Jul. 12, 2018

(65) Prior Publication Data
US 2019/0344295 A1 Nov. 14, 2019

(51) Int. Cl.
*B05C 5/00* (2006.01)
*B05B 7/26* (2006.01)
(Continued)

(52) U.S. Cl.
CPC .............. *B05B 7/26* (2013.01); *B05C 5/00* (2013.01); *C08J 5/042* (2013.01); *C08J 7/0427* (2020.01)

(58) Field of Classification Search
CPC ... B05D 1/02; B05D 1/26; B05D 1/34; B05D 5/12; B05C 5/00; C08J 5/042
See application file for complete search history.

(56) References Cited

U.S. PATENT DOCUMENTS 4,749,554 A * 6/1988 Proksa ................. B29B 7/7457
366/159.1
2002/0129767 A1* 9/2002 Czerwonka .............. B05B 7/16
118/667

(Continued)

FOREIGN PATENT DOCUMENTS

JP 2001-239199 A 9/2001
JP 2002-102757 A 4/2002
(Continued)

OTHER PUBLICATIONS

International Search Report dated Mar. 21, 2017, issued in counterpart International Application No. PCT/JP2017/000308, with English Translation. (6 pages).

(Continued)

*Primary Examiner* — Nathan H Empie
(74) *Attorney, Agent, or Firm* — Westerman, Hattori, Daniels & Adrian, LLP

(57) ABSTRACT

This disclosure is related to a method for applying insulative coating to a carbon-fiber exposed end of a composite material part using a dispenser device. The dispenser device includes a nozzle discharging a first material or a mixed material obtained by mixing the first material and a second material. The method includes discharging the first material or the mixed material from the nozzle toward the carbon-fiber exposed end, and applying the first material or the mixed material to the carbon-fiber exposed end such that the carbon-fiber exposed end is covered with the insulative coating.

5 Claims, 10 Drawing Sheets

(51) Int. Cl.
*C08J 5/04* (2006.01)
*C08J 7/04* (2020.01)

(56) References Cited

U.S. PATENT DOCUMENTS

| | | |
|---|---|---|
| 2006/0186404 A1 | 8/2006 | Uchida et al. |
| 2007/0177330 A1* | 8/2007 | Ackerman ............... B29C 73/10 361/220 |
| 2008/0128430 A1* | 6/2008 | Kovach ................... B32B 27/00 220/586 |
| 2012/0187145 A1 | 7/2012 | Gould et al. |

FOREIGN PATENT DOCUMENTS

| | | |
|---|---|---|
| JP | 2005-149463 A | 6/2005 |
| JP | 2005-296896 A | 10/2005 |
| JP | 2006-68700 A | 3/2006 |
| JP | 2013-506555 A | 2/2013 |
| JP | 2013-202520 A | 10/2013 |
| WO | 2004/088733 A1 | 10/2004 |

OTHER PUBLICATIONS

Written Opinion of the International Searching Authority (Form PCT/ISA/237) dated Mar. 21, 2017, issued in counterpart International Application No. PCT/JP2017/000308 (6 pages).
Notification of Reasons for Refusal dated Feb. 6, 2018, issued in counterpart Japanese Patent Application No. 2017-528982, with English Translation. (8 pages).
Notification of Reasons for Refusal dated Apr. 24, 2018, issued in counterpart of Japanese Patent Application No. 2017-528982, with English Translation. (4 pages).
Decision to Grant a Patent dated Jun. 26, 2018, issued in counterpart of Japanese Patent Application No. 2017-528982 with English Translation (5 pages).

* cited by examiner

METHOD FOR APPLYING INSULATIVE COATING TO CARBON-FIBER EXPOSED END OF COMPOSITE MATERIAL PART USING DISPENSER DEVICE

TECHNICAL FIELD

The present invention relates to a method for applying insulative coating to a carbon-fiber exposed end of a composite material part using a dispenser device.

BACKGROUND ART

Carbon-fiber reinforced composite material is used in various fields including the field of aircrafts. Carbon-fiber reinforced composite material includes carbon fiber having conductivity. Therefore, if the composite material part formed of the carbon-fiber reinforced composite material is in contact with metal parts formed of aluminum alloy and the like, galvanic corrosion may occur to the metal parts. In order to suppress galvanic corrosion, the surface of the composite material part may be covered with insulating layer formed of glass and the like. However, if an end portion of the composite material part having been covered with the insulating layer is machined, the carbon fiber at the end portion will be exposed again.

Currently, in order to cover the carbon fiber exposed from the end portion of the composite material part with insulating material, a two-component mixed material (two-component mixed adhesive or two-component mixed resin) is applied to the end portion of the composite material part. However, due to the peculiarity of the location, that is, end portion of the composite material part, the application is actually performed manually.

However, if application is performed manually, there is a drawback that the mixed material being prepared is gradually hardened with the elapse of time, causing viscosity of the mixed material to change. Further, there is a drawback that long operation time is required to perform application manually.

Meanwhile, though it does not relate to covering the carbon fiber exposed from the end portion of the composite material part with insulating material, Patent Literature 1 discloses a mixing and coating device for mixing and coating a two-component adhesive. According to the mixing and coating device disclosed in Patent Literature 1, an application target of the two-component adhesive is a principal plane of a plate-like member, and not an end face thereof. Specifically, according to the mixing and coating device disclosed in Patent Literature 1, the application target of the two-component adhesive is the principal plane of an inner trim. As disclosed, it is possible to use a mixing and coating device for applying a two-component adhesive to a principal plane of a plate-like member.

CITATION LIST

Patent Literature

[Patent Literature 1] Japanese Patent Application Publication No. 2006-68700

SUMMARY OF INVENTION

Technical Problem

If the carbon fiber exposed at the end portion of the composite material part is covered with insulating material, dripping tends to occur from the end portion of the composite material part toward the principal plane of the composite material part. Therefore, it was common technical knowledge at the time of filing of the present application that it is difficult to automate the application of insulating material when covering the carbon fiber exposed from the end portion of the composite material part with insulating material. The present invention overturns the above-descried common technical knowledge and covers the carbon-fiber exposed end of the composite material part with insulative coating using a dispenser device.

Therefore, the object of the present invention is to provide a method for applying insulative coating to a carbon-fiber exposed end of a composite material part using a dispenser device.

Solution to Problem

In order to achieve the above-described object, in a method for applying insulative coating according to some embodiments, a carbon-fiber exposed end of a composite material part is covered with insulative coating using a dispenser device. The dispenser device includes a first tank that stores a first material, a second tank that stores a second material, a nozzle that discharges the first material or a mixed material obtained by mixing the first material and the second material, a first channel arranged between the first tank and the nozzle, a second channel arranged between the second tank and the nozzle, a first flow regulator arranged on the first channel and that regulates flow of the first material, a second flow regulator arranged on the second channel and that regulates flow of the second material, and a control unit that controls the first flow regulator and the second flow regulator. The above-described method for applying insulative coating includes a discharging step for discharging the first material or the mixed material from the nozzle toward the carbon-fiber exposed end, and a coating step for applying the first material or the mixed material discharged from the nozzle to the carbon-fiber exposed end such that the carbon-fiber exposed end is covered with the insulative coating.

According to the method for applying insulative coating described above, the nozzle can be a mixing nozzle that mixes the first material and the second material to form the mixed material, and that discharges the mixed material being formed. The method for applying insulative coating may further include a mixing step for mixing the first material and the second material in the mixing nozzle and forming the mixed material. The discharging step can be a step for discharging the mixed material from the mixing nozzle toward the carbon-fiber exposed end. Further, the coating step can be a step for applying the mixed material discharged from the mixing nozzle to the carbon-fiber exposed end such that the carbon-fiber exposed end is covered with the insulative coating.

According to the method for applying insulative coating described above, the composite material part may comprise a composite material part main body including a first side face, a second side face and an end face, and an insulating layer covering the first side face and the second side face. The carbon-fiber exposed end may include the end face, a first corner portion arranged between the end face and the first side face, and a second corner portion arranged between the end face and the second side face. The first corner portion can be a chamfered or rounded corner portion. The second corner portion can be a chamfered or rounded corner portion. The coating step can be a step for covering the end face, the first corner portion and the second corner portion with the first material or the mixed material.

According to the method for applying insulative coating described above, the coating step can be a step for covering the end face, the first corner portion and the second corner portion with the first material or the mixed material such that the first material or the mixed material does not reach the side face of the insulating layer.

According to the method for applying insulative coating described above, when a width of the first material or the mixed material after executing the coating step is defined as a width a, a height of the first material or the mixed material after executing the coating step is defined as a height b, and a thickness of the composite material part main body is defined as a thickness t, the width a can be equal to or greater than the thickness t, and the height b can be equal to or greater than 0.1 mm and equal to or smaller than half the width a.

According to the method for applying insulative coating described above, when a width of the first material or the mixed material after executing the coating step is defined as width a, a height of the first material or the mixed material after executing the coating step is defined as a height b, a thickness of the composite material part main body is defined as a thickness t, and a dripping height of the first material or the mixed material from the end face after executing the coating step is defined as a dripping height c, the width a can be equal to or greater than the thickness t, the height b can be equal to or greater than 0.1 mm and equal to or smaller than half the width a, and the dripping height c can be set such that the first material or the mixed material covers an upper end of the insulating layer.

According to the method for applying insulative coating described above, a shape of an opening portion of the nozzle can be an elongated shape. Further, an upper surface of a center portion of the first material or the mixed material after executing the coating step may have a flat shape.

According to the method for applying insulative coating described above, the dispenser device may include at least one of a nozzle extension portion arranged on a distal end portion of the nozzle and a temperature adjustment device that regulates temperature of the first material or the mixed material.

Advantageous Effects of Invention

The present invention enables to provide a method for applying insulative coating to a carbon-fiber exposed end of a composite material part using a dispenser device.

DESCRIPTION OF EMBODIMENTS

Now, a dispenser device and a method for applying insulative coating according to an embodiment will be described with reference to the drawings. In the following description of embodiments, portions and members having the same function are denoted with the same reference number, and descriptions of the portions and members denoted with the same reference number will not be repeated.

(Composite Material Part)

Figure 1:
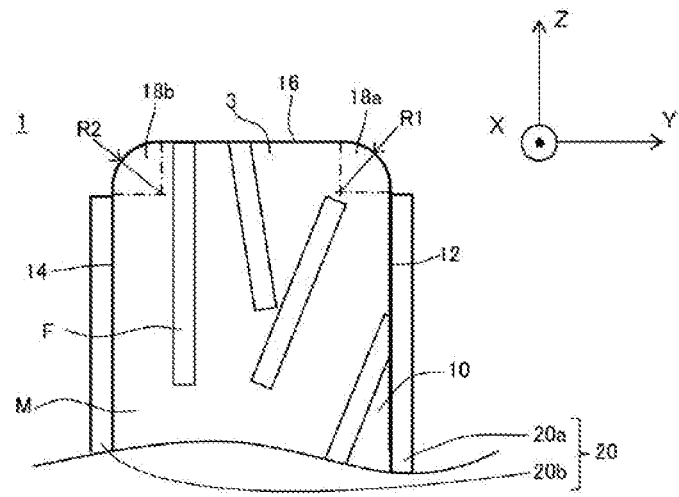
FIG. 1 is a schematic cross-sectional view illustrating a composite material part.

A composite material part 1 serving as a coating target to be coated with mixed material will be described with reference to FIG. 1. FIG. 1 is a schematic cross-sectional view illustrating the composite material part 1. In FIG. 1, direction Z corresponds to a vertical direction (upward direction). Direction X corresponds to a direction perpendicular to direction Z and also corresponds to a direction along a side face, that is, principal plane, of the composite material part 1. Further, direction Y corresponds to a width direction of an end face 16 of the composite material part 1.

The composite material part 1 includes a composite material part main body 10 and an insulating layer 20 covering the side face of the composite material part main body 10 (in other words, the insulating layer). The composite material part main body 10 includes a first side face 12, a second side face 14 and an end face 16. The first side face 12 is covered with a first insulating layer 20a, and the second side face 14 is covered with a second insulating layer 20b. The end face 16 is not covered with the insulating layer 20 and is exposed. That is, the end face 16 of the composite material part 1 is machined (cut, cut-processed, polished and so on) and exposed. Therefore, the end face 16 is a portion that should be covered with insulative coating formed by a mixed material described later.

The composite material part main body 10 includes a carbon fiber F and a resin M. When the resin M is thermosetting resin, the composite material part main body 10 is CFRP (Carbon Fiber Reinforced Plastic), and when the resin M is thermoplastic resin, the composite material part main body 10 is CFRTP (Carbon Fiber Reinforced Thermo Plastic). A portion of the carbon fiber F is exposed at the end face 16.

The insulating layer 20 can be, for example, a glass layer (the glass layer may be a glass fiber layer containing glass fiber). The carbon fiber F exposed from the first side face 12 or the second side face 14 of the composite material part main body 10 is covered with the insulating layer 20. As a result, the carbon fiber F exposed from the first side face 12 or the second side face 14 is prevented from coming in contact with a metal component (not shown). Thus, galvanic corrosion of the metal component is suppressed. In the example illustrated in FIG. 1, the insulating layer 20 includes the first insulating layer 20a covering the first side face 12 and the second insulating layer 20b covering the second side face 14.

The composite material part main body 10 includes a first corner portion 18a and a second corner portion 18b. The first corner portion 18a is a corner portion positioned between the end face 16 and the first side face 12, and the second corner portion 18b is a corner portion positioned between the end face 16 and the second side face 14. In the example illustrated in FIG. 1, the first corner portion 18a is a rounded corner portion and the second corner portion 18b is also a rounded corner portion. Radius R1 of the rounded portion of the first corner portion 18a is 0.1 mm or greater and 1.0 mm or smaller, for example. Further, radius R2 of the rounded portion of the second corner portion 18b is 0.1 mm or greater and 1.0 mm or smaller, for example.

Figure 2:
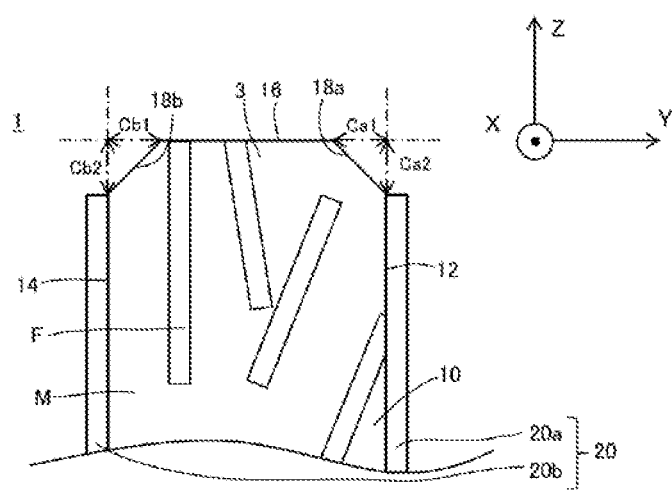
FIG. 2 is a schematic cross-sectional view illustrating the composite material part.

Alternately, the first corner portion 18a can be a chamfered corner portion, as illustrated in FIG. 2. In this case, chamfering length Ca1 at an end face side of the first corner portion 18a is 0.1 mm or greater and 1.0 mm or smaller, for example, and a chamfering length Ca2 at a first side face side of the first corner portion 18a is 0.1 mm or greater and 1.0 mm or smaller, for example. Similarly, the second corner portion 18b can be a chamfered corner portion, as illustrated in FIG. 2. In this case, a chamfering length CM at the end face side of the second corner portion 18b is 0.1 mm or greater and 1.0 mm or smaller, for example, and a chamfering length Cb2 at a second side face side of the second corner portion 18b is 0.1 mm or greater and 1.0 mm or smaller, for example.

The first corner portion 18a (rounded portion) in FIG. 1 or the first corner portion 18a (chamfered portion) in FIG. 2 is not covered with the insulating layer 20. Further, the second corner portion 18b (rounded portion) in FIG. 1 or the second corner portion 18b (chamfered portion) in FIG. 2 is not covered with the insulating layer 20. Therefore, in FIGS. 1 and 2, the first corner portion 18a and the second corner portion 18b are areas to be covered with insulative coating formed by a mixed material described later.

When mixed material is applied to an end portion (a carbon-fiber exposed end 3) having a chamfered or rounded corner portion, the mixed material may easily drip from the corner portion toward the first side face 12 or the second side face 14. Further, when the whole end portion having the chamfered or rounded corner portion is not covered with the mixed material, an operation to apply the mixed material again must be performed such that the whole area is covered with the mixed material. Therefore, it had conventionally been considered that application of the mixed material must be performed manually. The present embodiment overturns the conventional common technical knowledge, and applies the mixed material to the end portion (the carbon-fiber exposed end 3) using a dispenser device. In various embodiments, a mechanism for maintaining appropriate and constant surface tension of the mixed material is optionally added to a nozzle of the dispenser device. Detailed configuration of the dispenser device will be described later.

(Method for Applying Insulative Coating)

Figure 3:
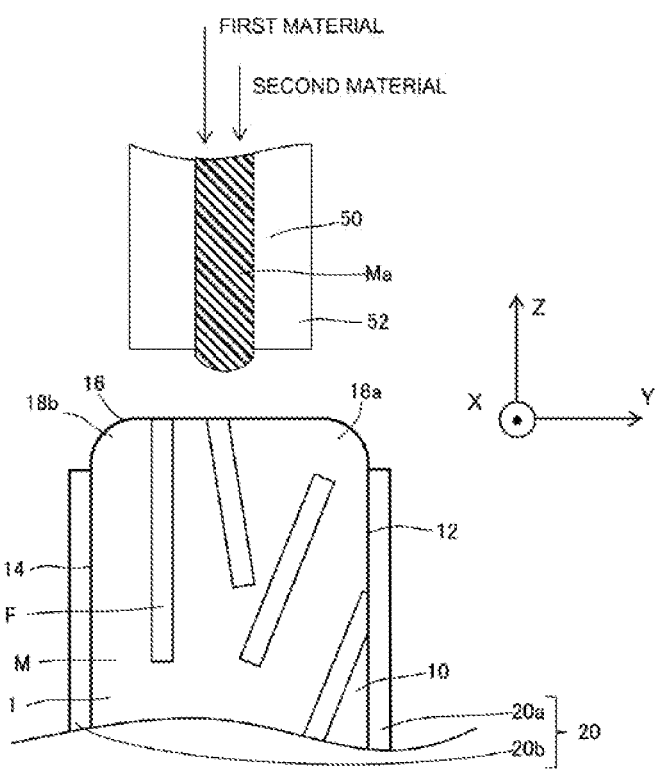
FIG. 3 is a schematic cross-sectional view illustrating a way for applying insulative coating using a dispenser device.
Figure 4:
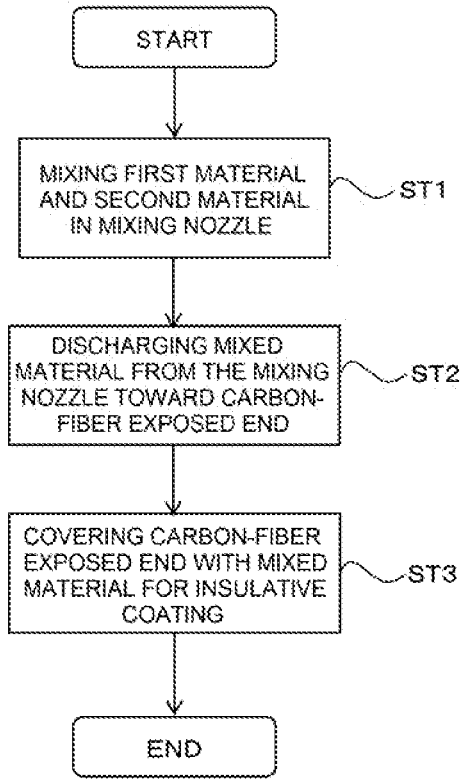
FIG. 4 is a flowchart illustrating a method for applying insulative coating according to an embodiment.

With reference to FIGS. 3 and 4, a method for applying insulative coating according to an embodiment will be described. FIG. 3 is a schematic cross-sectional view illustrating a way for applying insulative coating using a dispenser device 50. FIG. 4 is a flowchart illustrating a method for applying insulative coating method according to the present embodiment.

The method for applying insulative coating is a method for covering the carbon-fiber exposed end 3 of the composite material part 1 with the insulative material using the dispenser device 50. The dispenser device 50 is equipped with a mixing nozzle 52 for forming a mixed material Ma by mixing a first material and a second material, and discharging the mixed material Ma. Configurations other than the mixing nozzle 52 of the dispenser device 50 will be described later. The first material is a resin material in liquid state, and it is also an electrical insulating material. The second material is a resin material (for example, curing agent) in liquid state, and it is also an electrical insulating material. The second material is a material that differs from the first material. The first material and second material are mixed in the mixing nozzle 52. The mixed material Ma hardens with time. When a mixed material agitation mechanism 520 (refer to FIG. 6) such as a rotary vane is disposed inside the mixing nozzle 52, mixing of the first and second materials is promoted in the mixing nozzle 52. The rotary vane may be driven by a motor.

In a first step ST1, the first and second materials are mixed in the mixing nozzle. That is, the first step ST1 is a step for forming the mixed material Ma.

In a second step ST2, the mixed material Ma is discharged from the mixing nozzle 52 to the carbon-fiber exposed end 3. The second step ST2 can be performed by relatively moving the mixing nozzle 52 with respect to the composite material part 1 in direction X (that is, longitudinal direction of the end face 16), for example.

In the third step ST3, the carbon-fiber exposed end 3 is insulatively covered with the mixed material Ma.

In the fourth step ST4, the mixed material Ma is hardened with time, and the mixed material Ma is fixed to the carbon-fiber exposed end 3.

Figure 5:
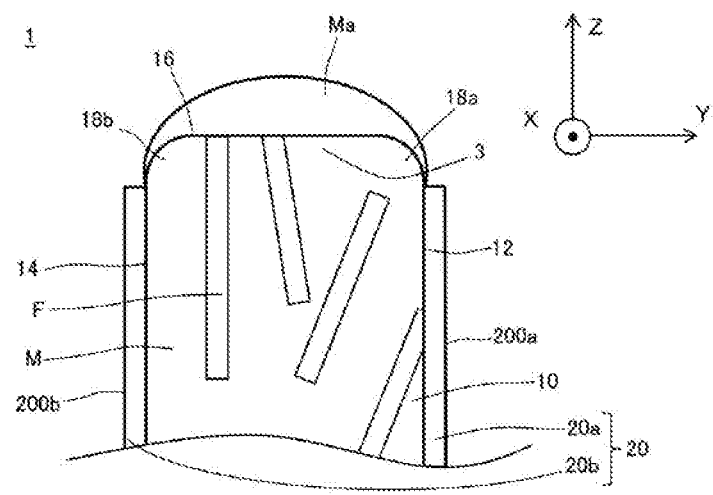
FIG. 5 is a schematic cross-sectional view illustrating a state of a composite material part after executing a third step ST3 (or a fourth step ST4).

FIG. 5 is a schematic cross-sectional view illustrating a state of the composite material part 1 after executing the third step ST3 (or the fourth step ST4). By referring to FIG. 5, the carbon-fiber exposed end 3 of the composite material part 1, that is, the end face 16 and the corner portions (18a, 18b) are insulatively covered with the mixed material Ma. Meanwhile, side faces (12, 14) of the composite material part 1 is insulatively covered with the insulating layer 20. As a result, even if the composite material part 1 and the metal component are in contact, galvanic corrosion of the metal component can be suppressed.

In the example illustrated in FIG. 5, both the first corner portion 18a and the second corner portion 18b are rounded corner portions. Alternately, at least one of the first corner portion 18a and the second corner portion 18b can be a chamfered corner portion.

In the example illustrated in FIG. 5, the carbon-fiber exposed end 3 is covered with the mixed material Ma such that the mixed material Ma does not reach a side face 200a of the first insulating layer 20a and such that the mixed material Ma does not reach a side face 200b of the second insulating layer 20b. Therefore, there is little risk that the mixed material Ma interferes with other parts arranged around the composite material part 1. Further, the appearance of the composite material part 1 is improved after applying the mixed material Ma to the carbon-fiber exposed end 3.

Further, it is possible to expose the end portion of the composite material part main body 10 prior to execution of the first step ST1 and to execute a step to form the carbon-fiber exposed end by exposing the end portion of the composite material part main body 10. In that case, at first, an end portion, the first side face 12 and the second side face 14 of the composite material part main body 10 are covered with the insulating layer 20. After that, by performing the machining (cutting, cut-processing, polishing or a combination thereof), the end portion of the composite material part main body 10 is exposed as the carbon-fiber exposed end 3.

(First Example of Dispenser Device)

Figure 6:
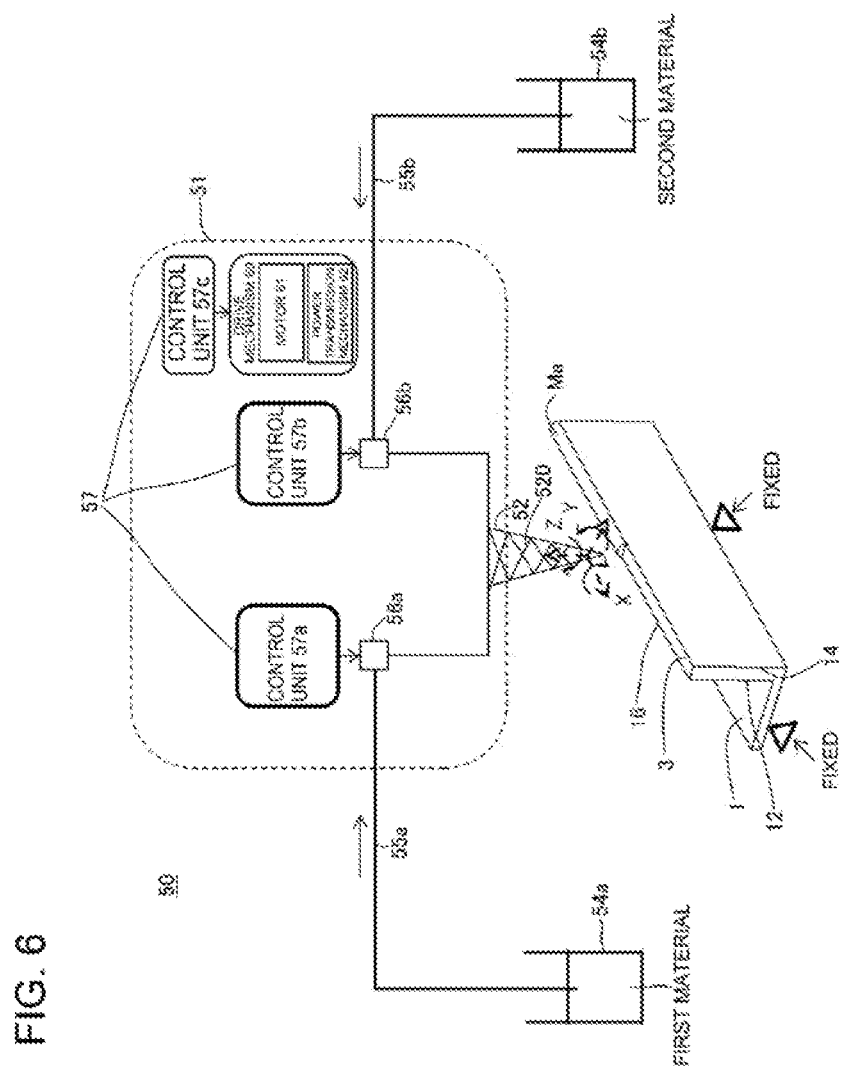
FIG. 6 is a function block diagram illustrating a first example of the dispenser device.

With reference to FIG. 6, the dispenser device 50 will be described in further detail. FIG. 6 is a function flock diagram illustrating a first example of the dispenser device 50.

The dispenser device 50 includes a first tank 54a for storing the first material, a second tank 54b for storing the second material, and the mixing nozzle 52 for mixing and discharging the first and second materials. The dispenser device 50 further comprises a first channel 55a, a second channel 55b, a first flow regulator 56a, a second flow regulator 56b, and at least one control unit 57.

The first channel 55a is arranged between the first tank 54a and the mixing nozzle 52. Further, the second channel 55b is arranged between the second tank 54b and the mixing nozzle 52. The first channel 55a and the second channel 55b are respectively formed of a synthetic resin hose. The synthetic resin is, for example, polytetrafluoroethylene, nylon (polyamide resin) and so on.

The first flow regulator 56a is arranged on the first channel 55a and regulates the flow of the first material. The first flow regulator 56a can be a flow regulating valve or a flow regulating pump. The second flow regulator 56b is arranged on the second channel 55b and regulates the flow of the second material. The second flow regulator 56b can be a flow regulating valve or a flow regulating pump.

The control unit 57 controls the first flow regulator 56a and the second flow regulator 56b. That is, the control unit 57 transmits control signals to the first flow regulator 56a and the second flow regulator 56b respectively. For example, if the first flow regulator 56a is a flow regulating valve, opening of the flow regulating valve is varied based on the control signal from the control unit 57. Further, if the second flow regulator 56b is a flow regulating valve, opening of the flow regulating valve is varied based on the control signal from the control unit 57. In the example illustrated in FIG. 6, the control unit 57 includes a first control unit 57a that controls the operation of the first flow regulator 56a and a second control unit 57b that controls the operation of the second flow regulator 56b. Alternately, one control unit 57 can control the operations of the first flow regulator 56a and the second flow regulator 56b.

According to the example illustrated in FIG. 6, the dispenser device 50 includes a drive mechanism 60 that moves the device including the mixing nozzle 52 along direction X, and a control unit 57c that controls the drive mechanism 60. The drive mechanism 60 includes a motor 61 and a power transmission mechanism 62, and based on the control signal from the control unit 57c, moves the device including the mixing nozzle 52 along direction X. According to the example illustrated in FIG. 6, the control unit 57c and control units (57a, 57b) that control the above-described flow regulators are separate members, but the first control unit 57a, the second control unit 57b and the control unit 57c can also be composed of a single control unit.

In the example illustrated in FIG. 6, the mixing nozzle 52, the control unit 57, the drive mechanism 60 and the flow regulators (56a, 56b) are included in a robot mechanism 51. The robot mechanism 51 is configured to realize integral three-dimensional movement of the mixing nozzle 52, the control unit 57, the drive mechanism 60 and the flow regulators (56a, 56b). Therefore, the dispenser device 50 can execute insulative coating suitably even if the shape of the carbon-fiber exposed end 3 to which mixed material must be applied has a bend or a curve shape. Alternately, the robot mechanism 51 includes the mixing nozzle 52 and the drive mechanism 60, and the control unit 57 and flow regulators (56a, 56b) can be provided outside the robot mechanism 51.

FIG. 6 illustrated an example where the mixing nozzle 52 is moved and the composite material part 1 is fixed. Alternately, a configuration can be adopted where the mixing nozzle 52 is fixed and the composite material part 1 is moved. That is, the composite material part 1 can be attached to a movement mechanism such as the robot mechanism.

In the example illustrated in FIG. 6, the composite material part 1 which is the target of insulative coating is an elongated member having an L-shaped cross-section. Alternately, the composite material part 1 can be an elongated member having a C-shaped cross-section, or it can be a flat plate member having a linear cross-section. The longitudinal length of the elongated member can be 50 mm or greater and 6000 mm or smaller, for example.

The control unit 57 controls the flow regulators (56a, 56b) and the drive mechanism 60 such that the mixed material Ma does not drip from the carbon-fiber exposed end 3 toward the first side face 12 and the second side face 14. For example, the control unit 57c controls the drive mechanism 60 such that movement speed of the mixing nozzle 52 with respect to the carbon-fiber exposed end 3 is 5 mm/sec or faster and 80 mm/sec or slower. The actual movement speed is set in advance according to the material or viscosity and the like of the mixed material.

The control units (57a, 57b) control the first flow regulator 56a and the second flow regulator 56b such that the mixed material Ma does not drip from the carbon-fiber exposed end 3 toward the first side face 12 and the second side face 14. By controlling the ratio of the flow of first material controlled by the first flow regulator 56a and the flow of second material controlled by the second flow regulator 56b, a mixing ratio of the first material and the second material is determined. Further, by controlling a total flow of the flow of the first material controlled by the first flow regulator 56a and the flow of the second material controlled by the second flow regulator 56b, a discharge flow rate of the mixed material Ma is determined.

Figure 7:
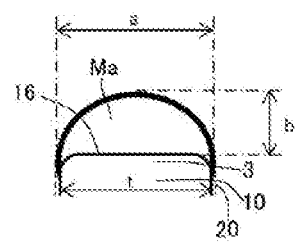
FIG. 7 is a schematic cross-sectional view illustrating a state of a mixed material after the mixed material has been applied to a carbon-fiber exposed end.

For example, the control units (57a, 57b) control the first flow regulator 56a and the second flow regulator 56b such that a state of the mixed material Ma after applying the mixed material Ma to the carbon-fiber exposed end 3 is in a state illustrated in FIG. 7.

In FIG. 7, a width (width in direction Y) of the mixed material Ma after applying the mixed material Ma is defined as width a, a height (height from the end face 16) of the mixed material Ma after applying the mixed material Ma is defined as height b, and a thickness (thickness in direction Y) of the composite material part main body 10 is defined as thickness t. At this time, in order to securely cover the end face 16 and corner portions (above-described first corner portion and second corner portion) with the mixed material Ma, the width a should preferably be equal to or greater than the thickness t and smaller than 1.5 times the thickness t. Further, in order to prevent dripping of the mixed material, it is preferable that the height b is 0.1 mm or greater and smaller than half the width a. If the height b is less than 0.1 mm, insulation between the metal component around the composite material part and the carbon fiber F may be insufficient (and dielectric breakdown may occur, for example). Further, if the height b is greater than half the width a, the risk of dripping of the mixed material is increased dramatically.

The above-described condition (t≤a≤1.5 t, 0.1 mm≤b≤a/2) is a condition that defines the state of the mixed material immediately after applying the mixed material, but the above-described condition is also satisfied after the mixed material has hardened. The movement speed of the mixing nozzle 52 and/or the discharge flow rate of the mixed material from the mixing nozzle 52 are controlled such that the above-described condition is satisfied. As a result, the carbon-fiber exposed end 3 is covered with the mixed material Ma securely, and at the same time, dripping of the mixed material Ma can be prevented. The thickness t is 1 mm or greater and 6 mm or smaller, for example.

Figure 8:
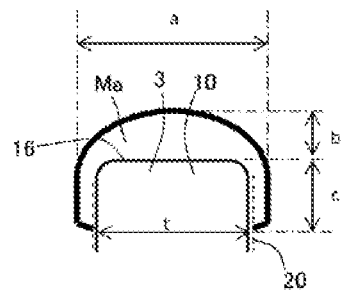
FIG. 8 is a schematic cross-sectional view illustrating a state of a mixed material after the mixed material has been applied to a carbon-fiber exposed end.

Alternately, there is a case where the state of the mixed material Ma after applying the mixed material Ma to the carbon-fiber exposed end 3 is allowed to be in a state as illustrated in FIG. 8, that is, in a dripped state. In other words, there may be a case where it is most important to provide insulative coating securely to the carbon-fiber exposed end 3, and greater tolerance is allowed for appearance or other matters.

In FIG. 8, a width (width in direction Y) of the mixed material Ma after application of the mixed material Ma is defined as a width a, a height (height from the end face 16) of the mixed material Ma after application of the mixed material Ma is defined as a height b, a thickness (thickness in direction Y) of the composite material part main body 10 is defined as a thickness t, and a dripping height from the end face 16 (distance between the end face 16 and a lowermost position of the mixed material, which is the distance along direction Z) is defined as a dripping height c. At this time, in order to securely cover the end face 16 and the corner portions (above-described first and second corner portions) with the mixed material Ma, it is preferable that the width a is equal to the thickness t or greater and 1.5 times the thickness or smaller. Further, the height b after dripping has occurred should preferably be 0.1 mm or greater. When the height b is equal to or greater than 0.1 mm, the insulation between the metal component around the composite material part and the carbon fiber F can be sufficiently ensured. In addition, the height b after dripping has occurred should preferably be half or smaller of the width a.

In order for the carbon-fiber exposed end 3 to be securely covered with the mixed material Ma, the dripping height c after dripping has occurred should preferably be set such that an upper end of the insulating layer 20 is covered with the mixed material Ma. In other words, the dripping height c should preferably be equal to or greater than a height where the mixed material Ma reaches the upper end of the insulating layer 20.

The above-described condition (t≤a≤1.5 t, 0.1 mm≤b≤a/2, c represents a height set such that that the mixed material Ma covers the upper end of the insulating layer 20) is a condition that defines the state of the mixed material immediately after the mixed material was applied and dripping has occurred, but the above-described condition is also satisfied after the mixed material has hardened. The movement speed of the mixing nozzle 52 and/or the discharge flow rate of the mixed material from the mixing nozzle 52 are controlled such that the above-described condition is satisfied. As a result, the carbon-fiber exposed end 3 is covered with the mixed material Ma securely.

(Second Example of Dispenser Device)

Figure 9:
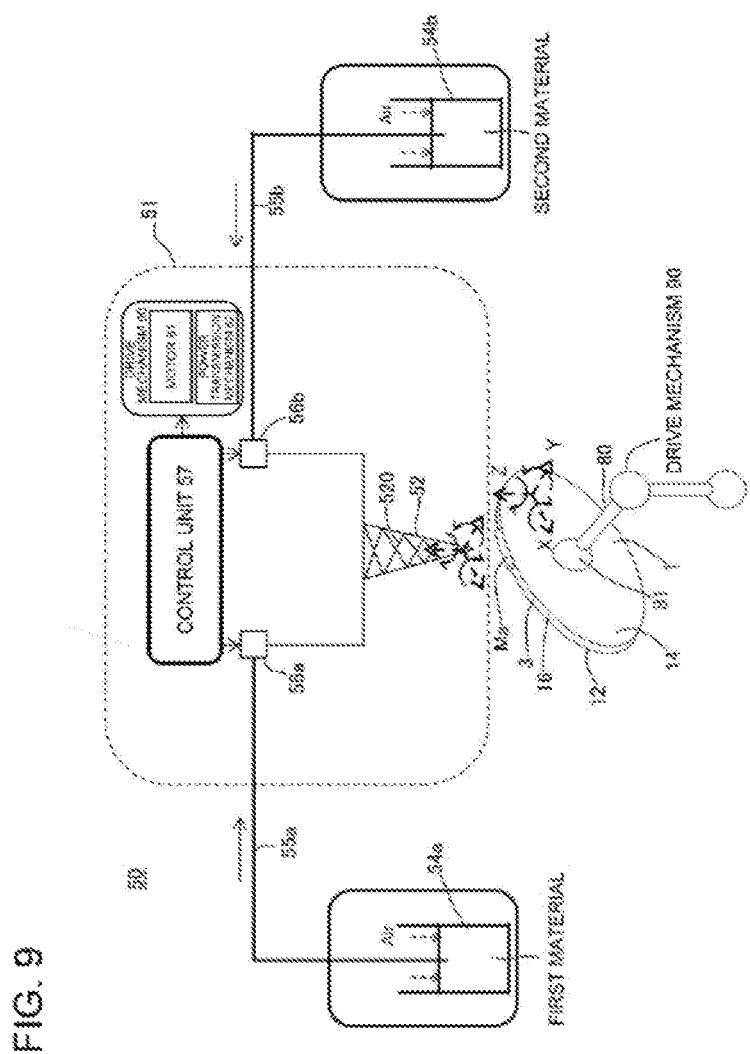
FIG. 9 is a function block diagram illustrating a second example of a dispenser device.

A second example of the dispenser device 50 will be described with reference to FIG. 9. FIG. 9 is a function block diagram illustrating a second example of the dispenser device 50. In the following description, the differences between the example illustrated in FIG. 9 and the example illustrated in FIG. 6 will be mainly described, and the description of the components of the example of FIG. 9 that are similar to the example of FIG. 6 will be omitted.

In the example illustrated in FIG. 9, the shape of the composite material part 1 differs from the shape of the composite material part illustrated in FIG. 6. The composite material part 1 illustrated in the example of FIG. 9 is equipped with an end face 16 having a curved shaped. In the example illustrated in FIG. 9, the mixed material is applied along the end face 16 having a curved shape, so that in addition to the dispenser device 50 being equipped with the drive mechanism 60, a support member 80 that supports the composite material part 1 is equipped with a drive mechanism 90. More specifically, in the example illustrated in FIG. 9, the mixing nozzle 52 is capable of three-dimensional movement, and in addition, a composite material part supporting portion 81 of the support member 80 that supports the composite material part 1 is capable of three-dimensional movement. Therefore, the mixed material can be applied to cover the end face 16 regardless of the shape of the end face 16, even if the end face 16, which has a curved shape, includes a surface facing upward and a surface facing downward (in that case, both the surface facing upward and the surface facing downward can be coated). The drive mechanism 90 includes a motor and a power transmission mechanism.

According to the example illustrated in FIG. 9, the first flow regulator 56a, the second flow regulator 56b and the drive mechanism 60 are controlled by one control unit 57. Since the flow regulators (56a, 56b) and the drive mechanism 60 are controlled by one control unit 57, the number of control units are cut down. As a result, the dispenser device 50 has reduced weight. Further, synchronous control of the flow regulators (56a, 56b) and the drive mechanism 60 can be realized more securely. According to the example illustrated in FIG. 9, the control unit 57 is arranged in the robot mechanism 51, but the control unit 57 can also be disposed outside the robot mechanism 51. Similarly, the flow regulators (56a, 56b) can also be disposed outside the robot mechanism 51 instead of inside the robot mechanism 51.

In the example illustrated in FIG. 9, the first material in the first tank 54a is supplied toward the first flow regulator 56a. Further, the second material in the second tank 54b is supplied toward the second flow regulator 56b. The first material in the first tank 54a can be supplied toward the first flow regulator 56a by a feed pump (not shown) provided on the first channel 55a, and the second material in the second tank 54b can be supplied toward the second flow regulator 56b by a feed pump (not shown) provided on the second channel 55b.

The state of the mixed material Ma after applying the mixed material Ma to the carbon-fiber exposed end 3 using the dispenser device 50 illustrated in FIG. 9 can be the state illustrated in FIG. 7 or the state illustrated in FIG. 8.

(Shape of Opening Portion of Mixing Nozzle)

Figure 10A:
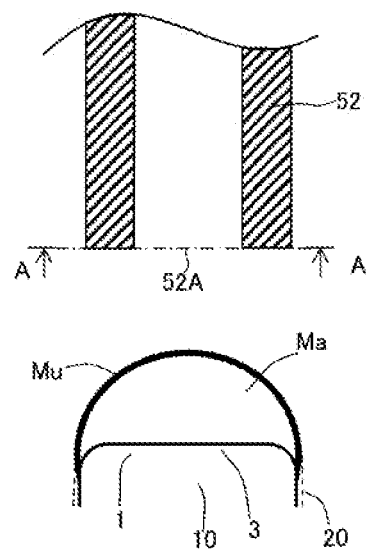
FIG. 10A is a schematic cross-sectional view illustrating a mixing nozzle and a composite material part.

A first example of a shape of an opening portion of the mixing nozzle will be described with reference to FIGS. 10A and 10B. FIG. 10A is a schematic cross-sectional view of the mixing nozzle 52 and the composite material part 1, and FIG. 10B is an A-A arrow view, that is, bottom view, of the mixing nozzle 52.

Figure 10B:
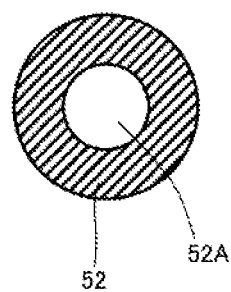
FIG. 10B is an A-A arrow view, that is, bottom view, of the mixing nozzle.

In the example illustrated in FIGS. 10A and 10B, the shape of an opening portion 52A of the mixing nozzle 52 is circular. When the shape of the opening portion 52A is circular, the mixed material Ma is applied to the carbon-fiber exposed end 3 such that a center portion is risen. In other words, the cross-sectional shape of an upper face Mu of the mixed material Ma is arc shaped.

Figure 11A:
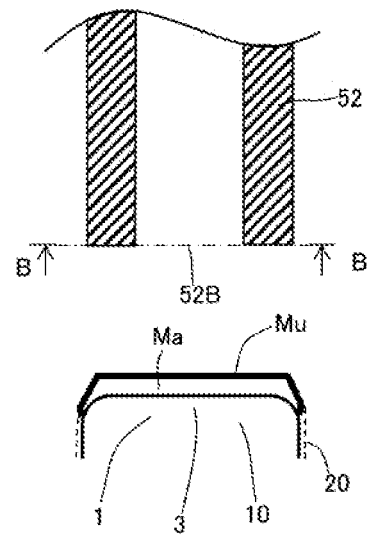
FIG. 11A is a schematic cross-sectional view illustrating a mixing nozzle and a composite material part.
Figure 11B:
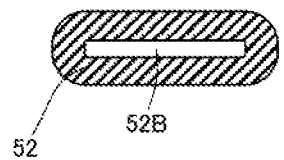
FIG. 11B is a B-B arrow view, that is, bottom view, of the mixing nozzle.

With reference to FIGS. 11A and 11B, a second example of the shape of an opening portion of the mixing nozzle will be described. FIG. 11A is a schematic cross-sectional view of the mixing nozzle 52 and the composite material part 1, and FIG. 11B is a B-B arrow view, that is, bottom view, of the mixing nozzle 52.

In the example illustrated in FIGS. 11A and 11B, the shape of an opening portion 52B of the mixing nozzle 52 is an elongated shape along direction Y. The shape of the opening portion 52B can be a rectangular shape or an elliptical shape. When the shape of the opening portion 52B is an elongated shape, the mixed material Ma is applied to the carbon-fiber exposed end 3 such that an upper face of the center portion is flat. In other words, the cross-sectional shape of the upper face Mu of the mixed material Ma is linear shape. Therefore, when it is desirable to apply the mixed material Ma as thin as possible, or when it is desirable to prevent dripping more securely, it is preferable to adopt the mixing nozzle 52 whose opening portion 52B has an elongated shape.

If an insulative coating method according to some embodiments is used, insulative coating (edge sealing) can be realized more uniformly compared to the manual insulative coating method of the prior art. Especially during application of the mixed material, viscosity of the mixed material varies with elapse of time after the materials have been mixed. In contrast, according to some embodiments, the mixed material is applied immediately after mixing the materials, so that the viscosity of the mixed material during application is maintained to a fixed value. As a result, insulative coating (edge sealing) can be performed more uniformly. Further, the time required for the insulative coating (edge sealing) operation can be reduced.

The thickness of the end portion of the composite material part is 1 mm or greater and 6 mm or smaller, for example, which is rather thin. In order to apply a mixed material to the end portion of such a thin part, it has been considered in the prior art that the mixed material must be applied manually. The present embodiment is revolutionary in that the operation for applying the mixed material to the end portion of such a thin part is automated. Especially when a chamfered or rounded corner portion is provided on the end portion, there is a risk of dripping and/or incomplete coating. Some embodiments are revolutionary in that the operation for applying the mixed material to the end portion of the composite material part having a chamfered or rounded corner portion is automated.

First Modified Example

Figure 12:
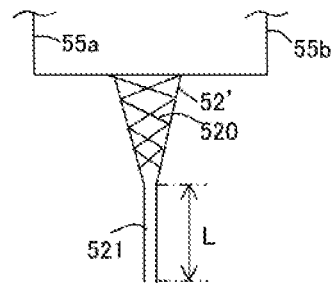
FIG. 12 is a schematic cross-sectional view illustrating a configuration of the mixing nozzle.

With reference to FIG. 12, a first modified example of a dispenser device and insulation applying method will be described. FIG. 12 is a schematic cross-sectional view illustrating a configuration of the mixing nozzle 52'. In the first modified example, a mechanism for realizing an appropriate and constant surface tension of the mixed material is provided on the mixing nozzle 52' of the dispenser device. Regarding other features, the dispenser device and insulation applying method according to the first modified example is similar to the dispenser device and the insulation applying method according to the first example or the dispenser device and the insulation applying method according to the second example described earlier. Therefore, the mixing nozzle 52' will be described in detail in the first modified example, and descriptions of components other than the mixing nozzle 52' are omitted and not repeatedly described.

In the first modified example, the mixing nozzle 52' includes a nozzle extension portion 521. The nozzle extension portion 521 is a portion that is arranged at an end further extending from a distal end of the mixed material agitation mechanism 520 (such as a rotary vane). In the first modified example, a length L of the nozzle extension portion 521 is greater than 0 mm. The length L of the nozzle extension portion 521 is, for example, 5 mm or greater, 50 mm or greater, or 200 mm or greater. Further, the length L of the nozzle extension portion 521 may be 1000 mm or smaller. If the length L of the nozzle extension portion 521 is long, the nozzle extension portion 521 can be provided separately from the mixing nozzle main body and the mixing nozzle 52' can be formed by joining the nozzle extension portion 521 and the mixing nozzle main body. In this case, the nozzle extension portion 521 can be a pipe having a rigid body or a tube having flexibility.

If the mixing nozzle 52' includes the nozzle extension portion 521, surface tension (or viscosity etc.) of the mixed material is suitably regulated in the nozzle extension portion 521. For example, a case is assumed where viscosity of the mixed material having passed the mixed material agitation mechanism 520 is low. In that case, when the mixed material is applied to the carbon-fiber exposed end, there is a risk of occurrence of dripping of the mixed material. In contrast, if the mixing nozzle 52' is equipped with the nozzle extension portion 521, hardening of the mixed material is started in the nozzle extension portion 521. Then, surface tension (or viscosity etc.) of the mixed material is suitably regulated in the nozzle extension portion 521. As a result, the risk of dripping of the mixed material is reduced.

The configuration of the nozzle extension portion 521 is a configuration that is adoptable in any of the examples illustrated in FIG. 6 and in FIG. 9. Further, the configuration of the nozzle extension portion 521 can be combined with the configuration of the opening portion 52B illustrated in FIG. 11B. In that case, the shape of the opening portion of the distal end of the nozzle extension portion 521 should be an elongated shape.

Second Modified Example

Figure 13:
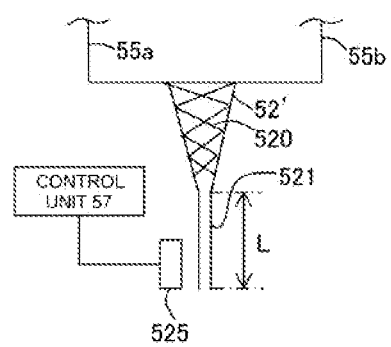
FIG. 13 is a schematic cross-sectional view illustrating a configuration of the mixing nozzle and a temperature adjustment device.

With reference to FIG. 13, a second modified example of a dispenser device and an insulation applying method will be described. FIG. 13 is a schematic cross-sectional view illustrating a configuration of the mixing nozzle 52' and a configuration of a temperature adjustment device 525. In the second modified example, the temperature adjustment device 525 that regulates the temperature of the mixed material is provided. Regarding other features, the dispenser device and insulation applying method according to the second modified example is similar to the dispenser device and the insulation applying method according to the first modified example described above. Therefore, the temperature adjustment device 525 will be described in detail in the second modified example, and descriptions of components other than the temperature adjustment device 525 are omitted and not repeatedly described.

The temperature adjustment device 525 is, for example, a heating device including a heater and the like. In the example illustrated in FIG. 13, the temperature adjustment device 525 is arranged around the nozzle extension portion 521 so as to face the nozzle extension portion 521. The temperature adjustment device 525 can be arranged annularly to surround the nozzle extension portion 521. Alternately, the temperature adjustment device 525 can be embedded in a wall portion of the nozzle extension portion 521.

Quantity of heat generated by the temperature adjustment device 525 is controlled based on a control signal from the control unit 57 and the like. As a result, temperature of the mixed material in the nozzle extension portion 521 is maintained to a fixed temperature (appropriate temperature). By maintaining the temperature of the mixed material to a fixed temperature, the surface tension of the mixed material is regulated appropriately. For example, a case is assumed where the viscosity of the mixed material discharged from the end of the nozzle extension portion 521 is low. In that case, when the mixed material is applied to the carbon-fiber exposed end 3, there is a risk of occurrence of dripping of the mixed material. In contrast, in a case where the dispenser device is equipped with the temperature adjustment device 525, the temperature of the mixed material in the nozzle extension portion 521 can be controlled appropriately. Thereby, the surface tension (or viscosity etc.) of the mixed material in the nozzle extension portion 521 can be suitably regulated. As a result, the risk of dripping of the mixed material is reduced. Meanwhile, if the viscosity of the mixed material discharged from the end of the nozzle extension portion 521 is high, the viscosity of the mixed material should be lowered using the temperature adjustment device 525. When the viscosity of the mixed material is lowered, the risk of the mixed material failing to cover the whole area of the carbon-fiber exposed end 3, that is, risk of occurrence of insulation failure, is reduced.

In the above-described example, an example in which the temperature adjustment device 525 includes the heating device has been described. Alternately, or in addition, the temperature adjustment device 525 may include a cooling device. Further according to the above-described example, the temperature adjustment device 525 is for regulating temperature of the mixed material after passing the mixed material agitation mechanism 520. Alternatively, the temperature adjustment device 525 can be disposed to regulate temperature of the mixed material that is passing through the mixed material agitation mechanism 520. In this case, the temperature adjustment device 525 should be disposed to face the mixing nozzle body portion or embedded in the wall portion of the mixing nozzle body portion. In this case, the configuration of the nozzle extension portion 521 can be omitted. However, the surface tension of the mixed material can be regulated more appropriately if the temperature adjustment device 525 is arranged facing the nozzle extension portion 521 compared to a case where it is arranged facing the mixing nozzle body portion.

The configuration of the temperature adjustment device 525 is adoptable in any of the example illustrated in FIG. 6, the example illustrated in FIG. 9 and the example illustrated in FIG. 11.

Third Modified Example

Figure 14:
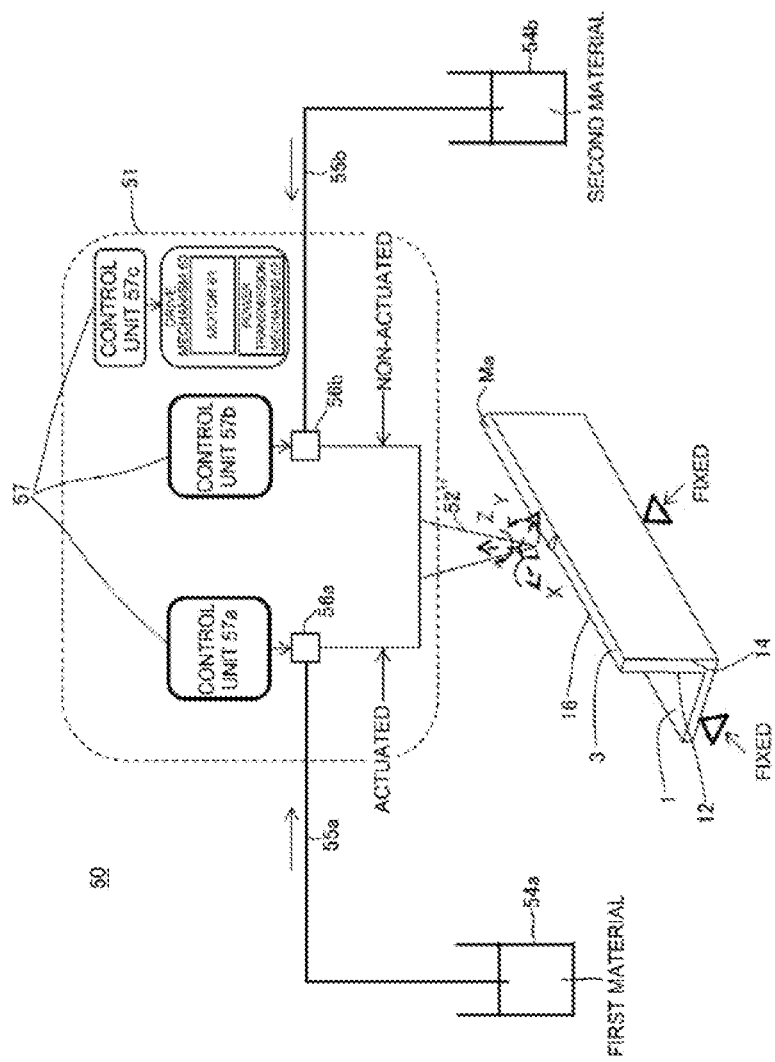
FIG. 14 is a function block diagram illustrating a dispenser device according to a third modified example.

With reference to FIG. 14, a dispenser device 50 and an insulation applying method according to a third modified example will be described. FIG. 14 is a function block diagram illustrating a dispenser device according to a third modified example. The dispenser device 50 and the insulation applying method according to the third modified example differs from the dispenser device and the insulation applying method according to the first example described above or the dispenser device and the insulation applying method according to the second example in that the first material is applied to the carbon-fiber exposed end 3 instead of the mixed material. The first material is an electric insulation resin (such as an adhesive having electric insulation property).

A case is considered where the carbon-fiber exposed end 3 is insulatively covered not with a mixed material but with a one component liquid resin (such as a one component adhesive). The dispenser device 50 according to the third modified example is capable of corresponding to the application of one component liquid resin in addition to the application of the mixed material. That is, the dispenser device 50 according to the third modified example can be used in a state where supply of second material to nozzle 52" is stopped.

In order to discharge the first material from the nozzle 52" toward the carbon-fiber exposed end 3 using the dispenser device 50 according to the third modified example, the first material in the first tank 54a is supplied from the first tank 54a through the first channel 55a to the nozzle 52". The first flow regulator 56a is arranged on the first channel 55a, and the flow of the first material supplied to the nozzle 52" is regulated by the first flow regulator 56a. Meanwhile, the second channel 55b is closed (for example, if the second flow regulator 56b is a valve, the valve is in a closed state), and the second material will not be supplied to the nozzle 52".

The first material supplied from the nozzle 52" is hardened on the carbon-fiber exposed end 3 and insulatively covers the carbon-fiber exposed end 3 to insulative coating.

Further, the nozzle 52" can be a mixing nozzle equipped with the mixed material agitation mechanism 520 and the like, or it can be a general-purpose nozzle that is not equipped with the mixed material agitation mechanism 520 and the like. That is, according to the insulation applying method according to the third modified example, there is no need to form the mixed material inside the nozzle 52". Therefore, a general-purpose nozzle can be adopted as the nozzle 52". More specifically, if applying the mixed material using the dispenser device 50 according to the third modified example, the mixing nozzle is attached to the dispenser device 50, and if applying only the first material using the dispenser device 50 according to the third modified example, a nozzle that is not equipped with the mixed material agitation mechanism can be attached to the dispenser device 50.

It is possible to combine the dispenser device 50 and the insulation applying method according to the third modified example with the dispenser device 50 and the insulation applying method according to the first modified example, or combine the dispenser device 50 and the insulation applying method according to the third modified example with the dispenser device 50 and the insulation applying method according to the second modified example. For example, the nozzle extension portion 521 can be disposed on the nozzle 52". Alternatively, or in addition, the temperature adjustment device 525 can be arranged to face the nozzle extension portion 521 or the nozzle body portion.

The dispenser device 50 according to the third modified example can correspond to applying only the first material. Therefore, general purpose property of the dispenser device is improved.

Some embodiments of the method for applying insulative coating to the carbon-fiber exposed end of the composite material part using a dispenser device has been described, but the method for applying insulative coating according to the present invention is not limited to the examples described above, and it can be subjected to various modifications. For example, in a case where the thickness of the end portion of the composite material part is relatively thick (for example, if the thickness is 5 mm or greater), the mixing nozzle 52 can be moved back and forth along the longitudinal direction of the carbon-fiber exposed end 3. In other words, the application of mixed material using the mixing nozzle 52 is not necessarily performed in a row, and it can be performed along a plurality of rows. Further, the opening of the mixing nozzle is not limited to one, and there can be a plurality of openings. For example, if a mixing nozzle having a plurality of opening portions arranged along direction Y is used, a similar effect (effect of applying a thin mixed material) as using a mixing nozzle having the elongated shape opening portion illustrated in FIGS. 11A and 11B can be expected.

It is also possible to subject the above-described embodiments to various modifications within the scope of the present invention.

REFERENCE SIGNS LIST

1: composite material part, 3: carbon-fiber exposed end, 10: composite material part main body, 12: first side face, 14: second side face, 16: end face, 18a: first corner portion, 18b: second corner portion, 20: insulating layer, 20a: first insulating layer, 20b: second insulating layer, 50: dispenser device, 51: robot mechanism, 52: mixing nozzle, 52': mixing nozzle, 52": nozzle, 52A: opening portion, 52B: opening portion, 54a: first tank, 54b: second tank, 55a: first channel, 55b: second channel, 56a: first flow regulator, 56b: second flow regulator, 57: control unit, 57a: first control unit, 57b: second control unit, 57c: control unit, 60: drive mechanism, 61: motor, 62: power transmission mechanism, 80: support member, 81: composite material part support portion, 90: drive mechanism, 200a: side face, 200b: side face, 520: mixed material agitation mechanism, 521: nozzle extension portion, 525: temperature adjustment device, Ma: mixed material

The invention claimed is:

1. A method for applying insulative coating to a carbon-fiber exposed end of a composite material part using a dispenser device in order to suppress galvanic corrosion of a metal component to be in contact with the composite material part,
the dispenser device comprising
a first tank configured to store a first material,
a second tank configured to store a second material,
a nozzle configured to discharge the first material or a mixed material obtained by mixing the first material and the second material,
a first channel arranged between the first tank and the nozzle,
a second channel arranged between the second tank and the nozzle,
a first flow regulator arranged on the first channel and configured to regulate flow of the first material,
a second flow regulator arranged on the second channel and configured to regulate flow of the second material, and
a control unit configured to control the first flow regulator and the second flow regulator,
the method comprising:
a discharging step for discharging the first material or the mixed material from the nozzle toward the carbon-fiber exposed end; and
a coating step for applying the first material or the mixed material discharged from the nozzle to the carbon-fiber exposed end such that the carbon-fiber exposed end is covered with the insulative coating,
wherein when a height of the first material or the mixed material after executing the coating step is defined as a height b, the height b is equal to or greater than 0.1 mm,
wherein the composite material part comprises
a composite material part main body comprising a first side face, a second side face and an end face, and
an insulating layer covering the first side face and the second side face,
wherein the carbon-fiber exposed end comprises
the end face,
a first corner portion arranged between the end face and the first side face, and
a second corner portion arranged between the end face and the second side face,
wherein the first corner portion is a chamfered or rounded corner portion,
the second corner portion is a chamfered or rounded corner portion, and
the coating step is a step for covering the end face, the first corner portion and the second corner portion with the first material or the mixed material,
wherein the coating step is a step for covering the end face, the first corner portion and the second corner portion with the first material or the mixed material such that the first material or the mixed material does not reach a side face of the insulating layer.

2. The method according to claim 1,
wherein the nozzle is a mixing nozzle configured to mix the first material and the second material to form the mixed material, and to discharge the mixed material being formed;
the insulative coating method further comprises
a mixing step for mixing the first material and the second material in the mixing nozzle and forming the mixed material,
the discharging step is a step for discharging the mixed material from the mixing nozzle toward the carbon-fiber exposed end, and
the coating step is a step for applying the mixed material discharged from the mixing nozzle to the carbon-fiber exposed end such that the carbon-fiber exposed end is covered with the insulative coating.

3. The method according to claim 1,
wherein when a width of the first material or the mixed material after executing the coating step is defined as a width a, and a thickness of the composite material part main body is defined as a thickness t,
the width a is equal to or greater than the thickness t, and the height b is equal to or smaller than half the width a.

4. The method according to claim 1,
wherein a shape of an opening portion of the nozzle is an elongated shape, and
an upper surface of a center portion of the first material or the mixed material after executing the coating step has a flat shape.

5. The method according to claim 1,
wherein the dispenser device includes at least one of a nozzle extension portion arranged on a distal end portion of the nozzle and a temperature adjustment device configured to regulate temperature of the first material or the mixed material.

* * * * *